Patented Mar. 18, 1930

1,751,438

UNITED STATES PATENT OFFICE

FRANK H. BERGEIM, OF LEONIA, NEW JERSEY, ASSIGNOR TO E. I. DU PONT DE NEMOURS & COMPANY, OF WILMINGTON, DELAWARE, A CORPORATION OF DELAWARE

NITRATED SORBITOL

No Drawing.   Application filed October 6, 1928.   Serial No. 310,926.

This invention relates to the art of explosives and more particularly to a new solid explosive produced by the nitration of sorbitol.

I am aware that certain of the solid alcohols, including sorbitol, have been nitrated heretofore but the product obtained by the nitration of sorbitol up to the time of this invention has been a liquid of unknown composition. By the process of nitration and purification herein described I have discovered that a hitherto unknown solid nitrosorbitol can be produced.

This invention has as an object the production of a new solid explosive compound by the nitration of sorbitol. Another object is the production of a solid nitrate of sorbitol having a known composition. Other objects will appear hereinafter.

These objects are accomplished by the following invention which comprises precipitating solid sorbitol hexanitrate out of an alcohol solution of a mixture of the nitrates of sorbitol.

The following specific example will serve to illustrate one of the preferred embodiments of my invention:

*Example:*—25 grams of dry powdered sorbitol are added to 120 grams of a mixed acid of the following composition: 51.64% $H_2SO_4$, 48.01% $HNO_3$, .53% $HNOSO_4$, −.18% $H_2O$. The temperature of the mixed acid is kept between 10° and 50° C. Temperatures below 10° C. are not desirable, since they cause the nitrated sorbitol to become thick and gummy. The temperature is kept below 50° C. for reasons of safety, although it may at times be desirable to use somewhat higher temperatures. A mixture of the nitrates of sorbitol is obtained as an oil which rises to the top of the nitrating acid and is separated therefrom. This oil is subjected to two washings, the temperature being maintained at 35° to 40° C. for the purpose of keeping the liquid thin enough to wash properly. The first wash consists of agitation with water to remove most of the acid dissolved in the nitrated sorbitol. The second wash consists of treatment with sodium carbonate solution to neutralize any traces of acid remaining after the water treatment.

The nitrates are then purified by dissolving in alcohol and forcing out of solution with water. This is carried out as follows: 47 grams of liquid nitrated sorbitol, as obtained above, are dissolved in 400 cc. of 95% alcohol. The solution is filtered and 400 cc. of water are added. The solid nitrate of sorbitol precipitates out and is filtered and washed with water. The precipitate is then dissolved by warming in alcohol and on cooling a solid crystallizes out having a melting point of 54° to 55° C. and a nitrogen content of 18.48% as analyzed by the nitrometer method, indicating that it is sorbitol hexanitrate. Upon adding more water to the original alcohol solution after the removal of the first precipitate, more hexanitrate is precipitated out, but has a melting point of 52° or 53° C.

The above example is, of course, merely illustrative and it is not intended that the procedure, quantities of materials, or temperatures are to be limited to those given, for it will be apparent that many changes in the details of both the nitration and purification procedures may be made within the scope of my invention. For example, in the nitration process, the sorbitol may be added to the mixed acid, either in the form of a powder or it may be melted and poured into the acid. Furthermore, I may use other methods of nitration than that given and also mixed acid of varying composition. Moreover, I may use a sorbitol obtained from natural sources or one prepared by any of the usual methods of converting sugars to their corresponding alcohols. I may, for example, reduce glucose with hydrogen and a nickel catalyst under high pressure according to a well known method. The sorbitol produced in this manner I have found particularly suitable for the production of a powerful solid explosive.

The liquid obtained by the nitration of sorbitol with mixed acid consists of a mixture of sorbitol hexanitrate and the lower nitrates of sorbitol and has a nitrogen content of about 17.21% corresponding to the nitrogen of the pentanitrate. Both the hexanitrate and the lower nitrates are soluble in 95% alcohol, but the hexanitrate is relatively insoluble in water and may be precipitated from an alcohol solution of a mixture of them by adding water thereto. I have found that when the amount of water added to the solution of nitrates is in the ratio of approximately one volume of water to one volume of alcohol, a precipitate is obtained, which, after washing, redissolving in alcohol and recrystallizing, has a melting point of 54° to 55° C. When the proportion of water used in precipitating from the original alcohol solution is increased, the recrystallized precipitate may have as low a melting point as 44° C. and a nitrogen content of 17%. It will thus be seen that I can control the melting point of the final product within certain limits by control of the amounts of water used for precipitation.

The properties of my new explosive are such that it is a highly desirable commercial explosive. Its low melting point and great strength make it useful for all purposes in which a cast explosive is desired, such as, for example, in bombs, torpedoes, high explosive shell, and caps. On account of the fact that it is a solid, it is a valuable product for use as an ingredient for solid explosive dynamites such as the nitrostarch dynamites. It also has considerable value as an ingredient of smokeless powder and the ordinary liquid explosive dynamites.

As many apparently widely different embodiments of this invention may be made without departing from the spirit thereof, it is to be understood that I do not limit myself to the foregoing examples or description, except as indicated in the following patent claims.

I claim:

1. As a new compound, solid nitrated sorbitol.

2. As an article of manufacture, solid nitrated sorbitol containing over 17 per cent $N_2$ and having a melting point of above 44° C.

3. As a new compound, sorbitol hexanitrate.

4. As a new compound, solid sorbitol hexanitrate.

5. As a new compound, solid nitrated sorbitol containing approximately 18.48 per cent $N_2$ and melting at about 54° C.

6. The process of producing a solid explosive which comprises nitrating sorbitol, dissolving the nitration product thus obtained in alcohol, and adding water thereto.

7. The process of producing solid sorbitol hexanitrate which comprises nitrating hydrogenated glucose with a mixed acid, dissolving the nitration product thus obtained in alcohol, and adding water thereto.

8. As an article of manufacture, a mixture of nitrates of sorbitol containing from 17 to 18.48 per cent $N_2$ and having a melting point between 44° C. and 54° C.

In testimony whereof, I affix my signature.

FRANK H. BERGEIM.